United States Patent
Highsmith

(10) Patent No.: US 6,436,164 B1
(45) Date of Patent: Aug. 20, 2002

(54) PROCESS FOR GRANULE PRODUCTION

(75) Inventor: Ronald Earl Highsmith, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/947,603

(22) Filed: Sep. 6, 2001

Related U.S. Application Data

(62) Division of application No. 09/473,753, filed on Dec. 28, 1999, now Pat. No. 6,361,720.
(60) Provisional application No. 60/119,822, filed on Feb. 12, 1999.

(51) Int. Cl.$^7$ .................................................. C05C 3/00
(52) U.S. Cl. ................... 71/27; 71/57; 71/63; 71/64.03
(58) Field of Search ................................ 71/27, 57, 63, 71/64.03

(56) References Cited

U.S. PATENT DOCUMENTS

| | | | |
|---|---|---|---|
| 3,076,700 A | 2/1963 | Renner | 71/29 |
| 3,153,574 A | 10/1964 | Achorn et al. | 23/107 |
| 3,464,809 A | 9/1969 | Hicks | 71/61 |
| 3,705,794 A | 12/1972 | Czurak et al. | 71/29 |
| 3,725,029 A | 4/1973 | Blackmore | 71/28 |
| 3,738,821 A | 6/1973 | Barber | 71/36 |
| 4,554,004 A | 11/1985 | Blerman et al. | 71/29 |
| 4,589,904 A | 5/1986 | Harrison et al. | 71/61 |
| 4,743,289 A | 5/1988 | Mickus et al. | 71/61 |
| 5,078,779 A | 1/1992 | Van De Walle et al. | 71/63 |
| 5,102,440 A | 4/1992 | Gallant et al. | 71/28 |
| 5,266,097 A | 11/1993 | Moore | 71/28 |
| 5,330,544 A | 7/1994 | Thomson et al. | 23/313 |
| 5,374,292 A | 12/1994 | Detrick et al. | 71/28 |
| 5,574,005 A | 11/1996 | Welch et al. | 510/444 |

OTHER PUBLICATIONS

G.C. Hicks, "Development of a Granular Amonium Sulfate Process", J. Agr. Food Chem., vol. 17, No. 2, Mar.–Apr., 1969, pp. 308–311.

G.C. Hicks, "Basis for Selection of Granulators at TVA", 28$^{th}$ Annual Meeting of the Fertilizer Industry Round Table, Oct. 31–Nov. 2, 1978.

*Primary Examiner*—Chhaya D. Sayala
(74) *Attorney, Agent, or Firm*—Melanie L. Brown; Virginia Szigeti; Margaret S. Millikin

(57) ABSTRACT

An agglomeration process by which granules are formed by the steps of:

(a) injecting polymer having sufficient viscoelasticity; and (b) impacting particles on the polymer at the injection point.

The present invention is advantageous because it overcomes the problems of previous granulation process and subsequent art processes by having a very low recycle rate and allowing for control of granule size. It is particularly useful for fertilizer granule formation using a ureaform polymer and particles comprised of ammonium sulfate.

2 Claims, 7 Drawing Sheets

PROCESS FOR GRANULE PRODUCTION

This application is a divisional of application Ser. No. 09/473,753 filed Dec. 28, 1999, now U.S. Pat. No. 6,361,720. This application claims the priority date of abandoned provisional application Ser. No. 60/119,822, filed Feb. 12, 1999.

Background of the Invention

1. Field of the Invention

The present invention provides a novel granulation process using polymers with specific viscoelastic properties injected through one or more small holes into a moving bed of particles. More particularly, the invention relates to a process for making homogeneous fertilizer granules comprised of ureaform polymer and ammonium sulfate with reduction in the amount of recycle and possible elimination of a curing step.

2. Description of Related Art

Granulation refers to a process of agglomerating small particles by use of a liquid binder followed by drying or curing to make a solid larger particle, called a granule.

The fertilizer industry is a prime user of granulation processes. The most successful commercial fertilizer granulation process to date was developed by the Tennessee Valley Authority (TVA) and is a bulk granulation process. It uses a liquid binder prepared from ammonia and acids (see U.S. Pat. No. 3,153,574 and Hicks et al., "Basis for Selection of Granulators at TVA", 28th Annual Meeting of the Fertilizer Industry Round Table, Oct. 31–Nov. 2, 1978).

The TVA method, and processes similar to it, are bulk granulation processes and are typical in fertilizer granulation: numerous granules are produced simultaneously and with a wide range of sizes. The wide size distribution necessitates the sieving of the product to obtain the desired granule size. The undersized and oversized granules are recycled, the oversized ones being crushed first. In many processes, the amount of recycle can be very high, often 3 to 4 times the feed rate (for instance, see U.S. Pat. Nos. 4,589,904 and 3,464,809). Such recycle has a significant adverse impact on costs because the equipment must be 3 to 4 times larger than necessary, and each pass through the process requires more binder, utilities, labor and time. In processes where there is significant recycle, much of the growth in average particle size comes from increasing the size of the individual particles by layering additional material on each discrete particle rather than agglomeration of several particles into one granule.

Ammonium sulfate has proven to be a difficult material to granulate (see for instance G. C. Hicks, et. al. in The Journal of Agriculture & Food Chemicals, Vol. 17, pages 306–311 (1969)). Hence, a number of improved processes have been developed in attempts to achieve economical and effective granulation of ammonium sulfate. For instance, U.S. Pat. No. 4,589,904 teaches the addition of metal sulfates, such as alum, to the typical ammonia-sulfuric acid binder to improve granulation of crystalline by-product ammonium sulfate. U.S. Pat. Nos. 3,725,029 and 4,743,289 teach the addition of lignosulfonates; however in contrast, U.S. Pat. No. 5,078,779 demonstrates the ineffectiveness of lignin sulfonate binders. These processes are disadvantageous because of cost, significant recycle, and/or poor granule properties.

Urea-formaldehyde, which has fertilizer capacity itself, has been employed as a polymeric binder to agglomerate particles. Exemplary teachings include U.S. Pat. Nos. 3,076,700, 3,705,794, 5,102,440, and 5,266,097 and DE 4,126,807. All of these ureaformaldehyde processes involve significant recycle, require expensive equipment and careful control, and generate products which require a drying step and/or suffer from dusting and dispensability problems.

In U.S. Pat. No. 4,554,004, the thermoplastic properties of urea phosphate are used as a binder. The resulting granules are soft and tacky, and require 12 to 16 hours of curing. U.S. Pat. No. 5,574,005 discloses an agglomeration process which uses a non-linear viscoelastic surfactant paste and a detergent builder in the agglomeration of detergent particles. The agglomerates are formed by treating the paste and builder in a high speed mixer/densifier then in a moderate speed mixer/densifier. This reference does not teach or suggest the use of fertilizer materials in this process, nor does it teach controlling the resulting granule size.

Processes which introduce a binder beneath the surface of a bed of fluidized particles are known. For instance, the layering process of U.S. Pat. No. 5,330,544, directed at achieving particles of uniform size, teaches spraying a saturated ammonium sulfate solution at the underside of a bed of ammonium sulfate feed crystals which are fluidized by a current of hot air. The resultant enlarged crystals, however, have a relatively high moisture content, requiring a drying process to reduce the moisture content to below 5%. This process does not teach a means of agglomerating smaller particles into a larger granule. U.S. Pat. No. 5,374,292, also a layering process, teaches the introduction of a sequence of reactive chemicals beneath the surface of a cascading bed of fertilizer particles to produce coated particles. A final coating of wax is introduced by similar means at the end of the process.

So it can be seen that there is a need for an improved granulation technology that: allows control of granule size, has low recycle and reduced environmental problems, exhibits overall cost-effective operation in today's environment, permits formulations to be easily changed and to be multi-component, and can be used to readily granulate fine particles.

SUMMARY OF THE INVENTION

In response to the forgoing need in the art, I have developed an agglomeration process by which granules are formed by the steps of:

(a) injecting polymer having sufficient viscoelasticity through one of small holes or narrow tubes; and (b) impacting particles on the polymer at the injection point.

The present invention is advantageous because it overcomes the problems of the old "TVA" ammoniation-bulk granulation process and subsequent art bulk processes. In addition to not being a bulk granulation process, other specific advantages of the instant invention include: low recycle and high throughput which result in low capital cost, control of granule size, ability to use ureaform polymers that are too viscous to spray, no odor or pollution problems, short drying or curing times, and low toxicity reagents. Ammonium sulfate, a common industrial by-product, is granulated efficiently and effectively without the need for sulfuric acid or liquid ammonia.

Other advantages of the present invention will be apparent from the following description, attached drawings, and attached claims.

DETAILED DESCRIPTION OF THE PREFERRED EMBODIMENTS

Figure 1:
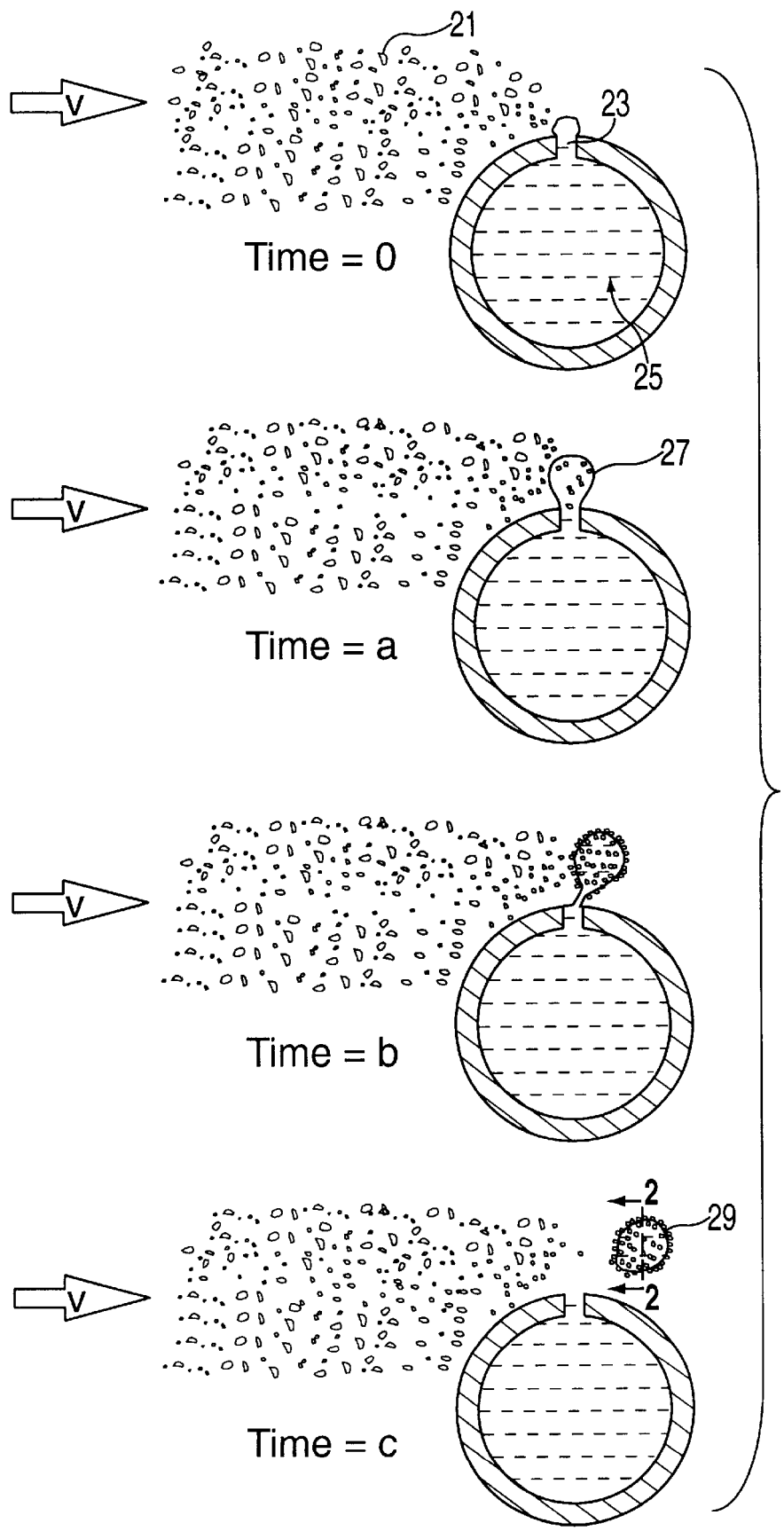
FIG. 1 illustrates a model for how granules are formed by use of this invention.

The phrase "injecting polymer" as used herein means to extrude continuously a polymer solution through a small aperture or apertures such that the extruded polymer part remains contiguous with the feed polymer solution until the force of the impacting particles dislodges the growing granule.

The term "nozzle" as used here means an essentially cylindrical, short, narrow tube on a larger pipe which thus forms an aperture through which polymer may be injected. The definition of "inject" is provided above.

The term "granule" as used herein means a roughly spherical object comprised of polymer and particles adhered to and embedded in the polymer. The term "growing granule" refers to a granule as it is being formed at a polymer injection aperture.

The terms "polymer" and "polymer solution" as used herein mean a material that has appropriate viscoelasticity to be injected into a continuous stream of moving particles and forms a growing granule which initially resists the force of the impacting particles. "Excess polymer" refers to the condition in which a granule contains more polymer than is necessary to form the granule. "Polymer flow rate" as used herein commonly refers to the flow rate at each injection point unless otherwise specified.

The term "sufficient viscoelasticity for granule formation" as used herein means a polymer solution or polymer having a recoverable compliance sufficient to resist the force of the impacting particles. Polymers having a recoverable compliance of at least about 3 Pascal$^{-1}$("Pa$^{-1}$") at room temperature have been found to be suitable for use in this invention. Ureaform polymers with lower viscoelasticity can be used to granulate acidic particles. Viscoelasticity is a complex subject but is readily understood and measured by those skilled in the art. The tendency for a liquid that has been disturbed to return to its original state is called compliance, $J_{(t)}$. It can be measured by sensitive rheometers and is expressed in terms of inverse Pascals (Pa$^{-1}$) or square centimeters per dyne (sq cm/dyne). Recoverable compliance is a steady state value and is denoted by the symbol, $J^{o}_{e}$. Recoverable compliance starts at zero when the stress is removed then increases, and eventually reaches a steady state. The compliance and recoverable compliance measurements reported herein were obtained on a Rheometrics Rheometer SR-200 over a range of $J_{(t)}$=0.1 to 100,000 Pa$^{-1}$ and time from 0 to 3500 seconds. Viscosity measurements were made using a Brookfield RTV viscometer with a number 2 or 4 spindle at 100 revolutions per minute (rpm) and were measured on the polymer solution directly. The viscosity, percent solids, and recoverable compliance of the polymers used in the examples are listed in Table I.

The term "ureaform polymer" as used herein means a polymer that is produced by the reaction of urea and formaldehyde in a mole ratio of about 1:1.3 to about 1:1.8, and that has a viscosity of greater than about 100 centipoise (cp) when the concentration is 40 to 70% (weight of solids/weight of polymer solution) in water.

The term "common fertilizer particles" as used herein means solid fertilizer particles, such as diammonium phosphate, potash, ammonium nitrate, various other phosphates, urea, and micronutrients.

The term "impacting particles" as used herein means particles smaller than the desired granule size but having appropriate size, mass, and flow character to provide a smooth uniform bed of particles having sufficient depth to cover the point of injection and having sufficient momentum to exert a measurable force on the granule growing at the injection point.

The term "acidic particles" as used herein means particles which will produce a pH of 6 or less when the particles are slurried in water.

The term "substantially recycleless" as used herein means employing less than bout 0.25 pounds of recycled material per pound of product or formed granule.

The term "SGN" as used in the industry and herein stands for Size Guide Number and is that size in millimeters (mm) where fifty percent (50%) of the particles are smaller and fifty percent (50%) are larger. The 50% point size is multiplied by 100 to eliminate the decimal point. For example, if 0.5 mm is the 50% point of a distribution of particle sizes, then the SGN is 50.

The term "particle flux" refers to the number of particles passing through the immediate area around the injection point per unit time. In most practice the particle velocity will determine the flux since the type and size of particles will already be selected.

Crush strength of granules is measured using an Amatek, Inc. Cadet Force Gage to crush granules. Ten granules, each passing a Tyler #7 sieve and retained on a Tyler #8, were crushed and the results averaged.

Previous methods generate granules by bulk phenomenon, for instance, by spraying a binder on a bed of particles in a rotating drum. The resulting granules, some large and some small, are formed simultaneously as the drum continues to turn and the fresh particle feed gradually forces the granules out of the spray zone. Therefore, particle size control must take place separately after granule formation and is achieved by screening the product. A novel process has been discovered which allows control of the granule size during the formation of each individual granule. The process consists of continuously injecting a polymer having certain critical viscoelastic properties through apertures (either small holes in pipes or nozzles attached to pipes) below the surface of a moving bed of fine particles having a certain critical flux. Granules are formed at the point of injection with one granule being formed at a time. The fine particles stick to and embed themselves within and on the surface of the polymer solution as it emerges from the hole or nozzle. These interactions result in a growing granule that is uniform throughout with respect to the particle distribution, and is not a globule of polymer with merely a coating of particles. The growing granule experiences a force which tends to sweep it away from the hole or nozzle depending on the momentum of the particles and the size of the growing granule. As the granule grows, the force become greater because the particles are able to impart more force to the larger cross-sectional area of the developing granule. The viscoelastic properties of the polymer resist the force tending to drag the growing granule away from the point of injection until, depending on the size of the growing granules, elasticity of the polymer, and momentum of the particles, the granules are swept off the hole or nozzle. Since the polymer feed solution is a continuous stream, a new granule begins to form as soon as the previous granule is swept away. The free granules tend to collect on top of the moving bed leaving the fines on the bottom where they are able to contact successive injectors. This naturally-occurring phenomenon prevents the granules that formed at the beginning of the drum from contacting subsequent injectors as they travel down the drum. If the polymer flow rate is very high and the particle flux is low it is possible that the granules will contain excess polymer, that is more polymer than is necessary to bind the particles together. It is also possible that so much polymer will be injected compared to the flux of particles that granules no longer form.

Therefore, for a given type of particle, polymer, and particle flux, the production and the size of the granules are a function of the rate of polymer injection and the momentum of the particles.

Figure 2:
FIG. 2 illustrates a schematic cross-section of a representative granule produced by the process of this invention.

For purposes of further illustrating the present invention, FIG. 1 illustrates one mechanism for formation of a granule by the method of this invention. The diagram illustrates the effect of the impact of the moving bed of particles on the growing granule from Time=0 to Time=c. The fine particles 21 flow toward the hole 23 from which the polymer 25 is emerging. At Time=0 the granule 27 starts to form at the point of polymer injection as a result of emerging polymer through the hole. The growing granule 27 will get larger with time because the polymer 25 flows through the hole 23 at a continuous rate and fresh polymer is continuously exposed to the particles. Time=a and Time=b illustrate the continued growth of the growing granule 27 and the concomitant accumulation of the particles onto and into it. Time=c illustrates the time at which the growing granule 27 has grown to a certain critical size such that the net force of the impacting particles is sufficient to sweep it away from the point of injection, forming a free granule 29. FIG. 2 shows a schematic cross-section of a free granule to illustrate that the process results in granules in which the particles are both on the surface and within the granule.

Figure 3:
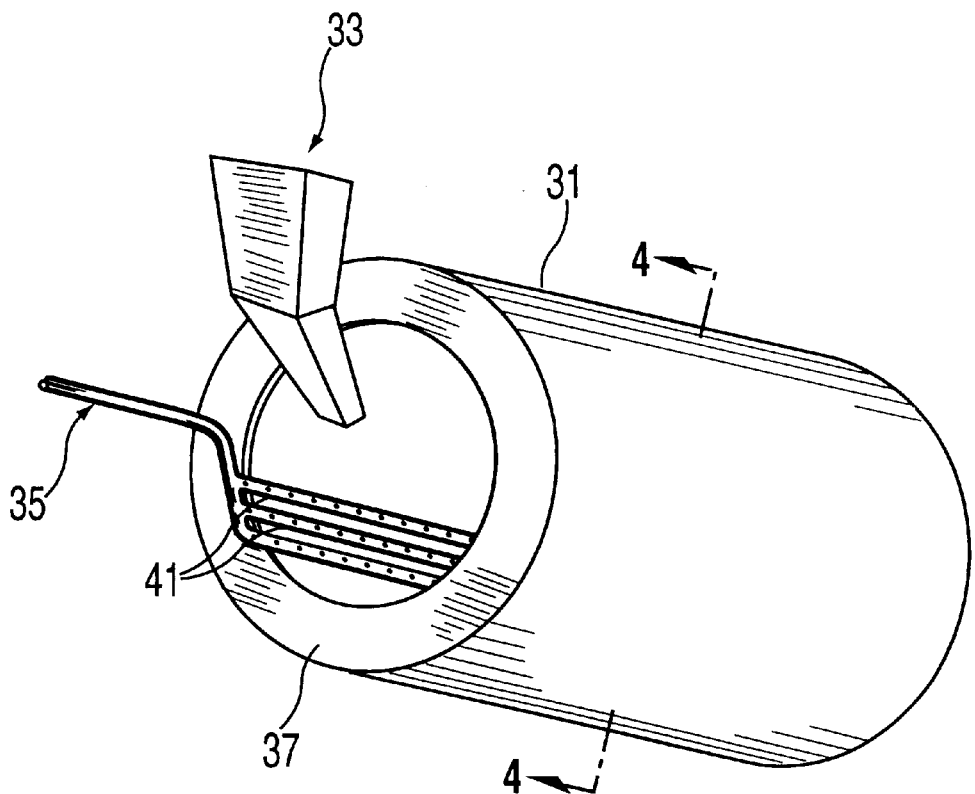
FIG. 3 illustrates a rotating drum useful for this invention.
Figure 4:
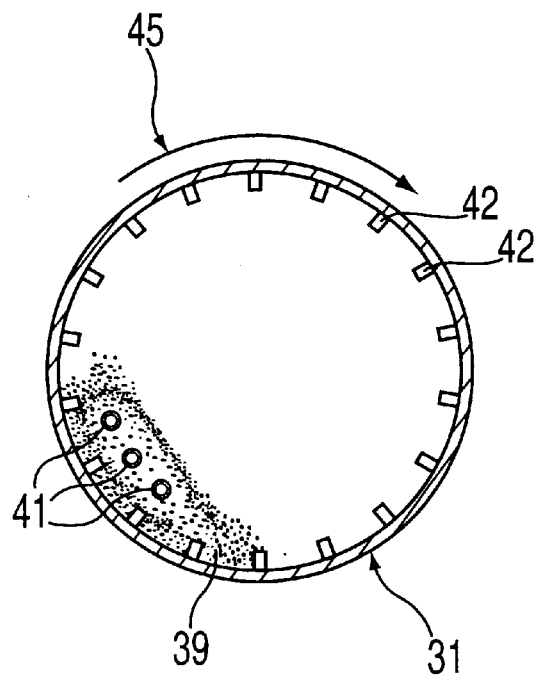
FIG. 4 illustrates a cross-section of a rotating drum useful for this invention.

Drum granulators are commonly known in the art and are applicable for this invention with the addition of a binder injection system. FIGS. 3 and 4 illustrate a preferred embodiment of the practice of this invention using an open-ended rotating drum granulator 31 which rotates around its lengthwise axis. Arrow 45 indicates the direction of rotation of drum granulator 31. Drum granulators are most commonly constructed from metal. Particles are fed into the drum granulator 31 via hopper 33 and a polymer solution is fed into the drum granulator 31 through pipe 35 which is in turn connected to three injector sets 41. The drum granulator 31 may be inclined or not. One or both ends of the drum granulator 31 are covered partially with a flat ring 37 such that the ring's opening is concentric with the drum's opening and has a ring width which is about 10% to about 40% of the drum granulator radius. When two flat rings 37 are used, they may have the same or different widths, the flat ring at the particle entrance end of drum granulator 31 typically being wider than that flat ring at the granule exit end of drum granulator 31. The ring at the granule exit end of the drum can be eliminated if desired. The flat rings 37 serve to establish the depth of the bed of fine particles 39 within the drum granulator 31. It is preferred that small lifting flights 42, a common element within some granulator drums, are attached to the inside of the drum wall essentially parallel to the axis and extending most of the length of the drum. Flights are common elements in granulator drum art. They are desired for the inventive process because they enhance the natural rolling action of a bed of solids in a rotating drum. A rolling action provides a further rounding off (increased sphericity) of the granules, an improvement of crush strength, and the reduction or elimination of any popcorn-like surface. Generally the most effective placement of the flights 42 is about 0.5 to 2 feet apart. For example, a 3-foot diameter drum having a circumference of about 9 feet may have approximately 4 to 18 flights. Conventional commercially-available drums are useful for use in the invention. The rotating drum granulator lends itself to continuous operation with the inventive process.

Figure 5:
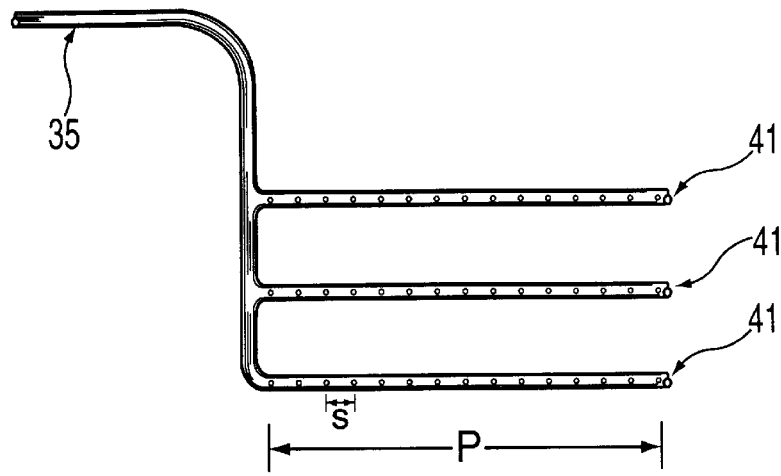
FIGS. 5 to 9 illustrate aspects of polymer injection systems useful in this invention.

FIG. 5 shows details of a polymer injection system for use in a drum granulator 31 with three injector sets 41 fed by polymer feedpipe 35. The injectors 41 are located parallel to the drum longitudinal axis beginning near the particle feed end of the drum. The injector sets must be under the moving bed of particles in a rotating drum. The length of the injector sets is preferably no more than 80% of the drum's length. It is preferable to keep about 20% of the length of the drum at the exit end free of injectors so as to allow the granules a final residence time in the drum for the granules to roll around and increase their uniformity. The injector sets 41 may be coplanar with one another as shown in FIG. 5 but this is not a necessity.

Figure 6:
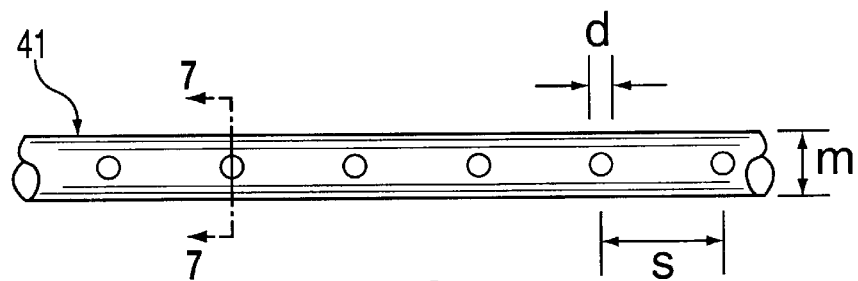
Figure 7:
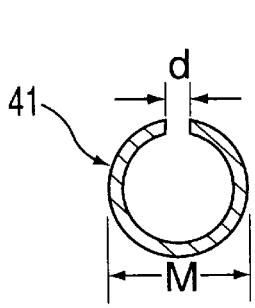
Figure 8:
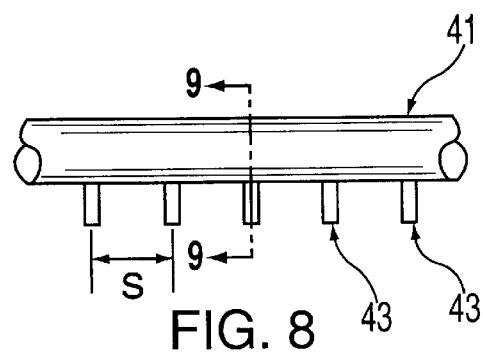
Figure 9:
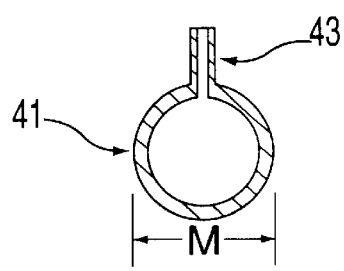
Figure 10:
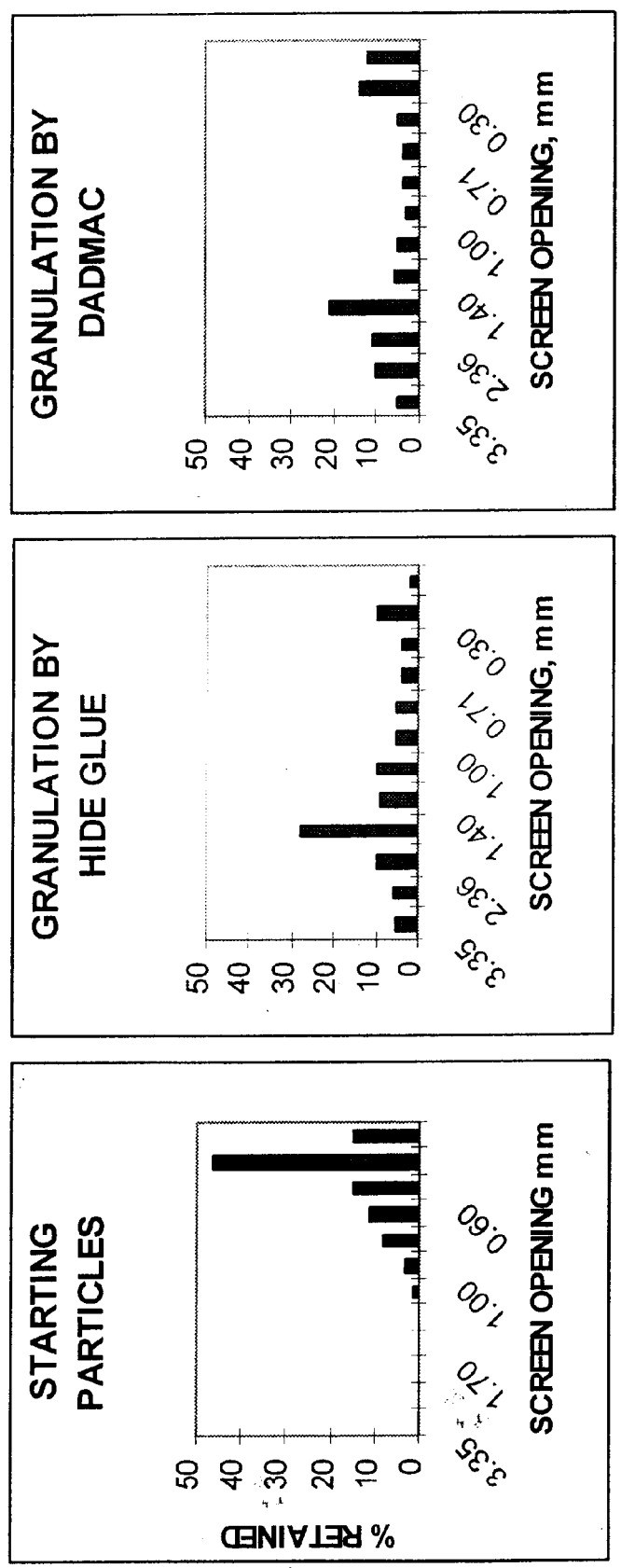
FIG. 10 illustrates bar graphs of the sieve analyses of products and particles in inventive examples 2 and 3.

FIGS. 6 through 9 illustrate details of two varieties of injector sets. FIG. 6 shows an enlarged view of a single injector set 41 having diameter M, with holes of diameter d drilled into it to serve as apertures through which polymer is injected into the moving bed of particles. In FIG. 8, an alternate injector set is shown wherein there are nozzles 43 attached to the injector set pipe 41 to serve as apertures. In both variations, the injector set pipe provides for the polymer to be conducted to the injection points provided by the apertures. In the injector set in FIG. 8, the injector set pipe serves to support the nozzles 43. For both variations of injector sets 41, the diameter M of the injector set pipe 41 itself should not be so great that it deflects or otherwise impedes the contact of the particles with the growing granule. However, the pipe diameter should be sufficiently large so that there is no significant resistance to flow of the polymer through the pipe. A typical injector set pipe 41 is on the order of about ½ inch (12.7 mm) to about 1 inch (25.4 mm) in diameter depending on the overall scale of the drum. The injector set pipe 41 does not have to be round. It is preferred that the polymer flow rate through each hole or nozzle should be approximately the same. Typically a plurality of holes will be drilled in the pipe of injector set 41. Likewise, a plurality of nozzles 43 will be fitted to an injector set pipe typically. The holes or nozzles are preferably collinear with each other but it is not a necessity. FIG. 7 shows a cross-section of an injector set 41 through a hole with diameter d. FIG. 9 shows a cross-section of the injector set pipe through a nozzle 43. The holes and the nozzles are small in diameter, usually on the order of about ⅛ inch (3.2 mm) to about 1/32 inch (0.8 mm), more preferably on the order of about 1/16 inch (1.6 mm) to about 1/32 inch (0.8 mm). Nozzles 43 may be made of cylindrical thin wall tubing of about 1 to about 6 inches long (about 25.4 mm to about 152.4 mm). For use with an injector set pipe of a nominal ½ inch (12.7 mm) or 1 inch (25.4 mm) diameter, nozzles 43 with an inside diameter of 1/16 formaldehyde inch (1.6 mm) may be used. The injector set pipe (or pipes) must be positioned in the bed of moving particles such that the particles come into continuous contact with emerging polymer, preferably at approximately a perpendicular angle to both the axis of the injector set pipe and the axis of the hole or nozzle. For any injector, the point of injection should be immersed in the flowing bed of particles to a depth of ¼ inch (6.35 mm) to about 1 inch (25.4 mm). The minimum distance between the wall of the drum and the injector set apertures (holes or nozzles) should be about ½ inch (12.7 mm) minimum.

The minimum distance S as shown in FIGS. 5, 6, and 8 between adjacent holes or nozzles from the center of one hole to the center of an adjacent hole is determined by the possibility of a growing granule influencing its neighbor. Although the particles, granules, holes, and nozzles are typically less than a few mm in diameter, it is preferable to have distance S greater than or equal to about ½ inch (12.7 mm).

For a given set of conditions and starting materials, the maximum polymer flow rate and a minimum particle velocity (flux) can be readily determined by observation of when granulation ceases (that is, when the granules no longer pop up to the surface or form). When the polymer flow rate exceeds the maximum, the results may range from formation of elongated "strings" of polymer and particles to a "wet bed" condition of the bed of particles. A wet bed condition occurs when most of the particles become wet with polymer and the particles no longer flow independently but rather, tend to move as one mass. As a result, granule formation ceases. At a fixed polymer flow rate and relatively low particle velocities, the granules will be larger as a result of low impact forces. Also as will be demonstrated in the Examples at velocities below a certain minimum particle velocity, larger granules will be formed because they contain excess polymer. Although the flow rate of the polymer can be easily measured, the particle velocity in a commercial system is difficult to measure. Part of the reason is that there is significant slip between the particles and the wall of the granulation drum. In addition, lifting flights on the wall impart a discontinuous velocity gradient to the particles. The minimum particle velocity can be estimated by measurements under conditions where the particles cannot slip such as a horizontal pan as in Experiment 3. At a given polymer flow rate, the useful range of particle velocities can be determined empirically by testing ranges of the rate of drum rotation, size of drum, and number of lifting flights.

The present invention allows for use of polymers having a high concentration of solids, with the advantageous consequence that less drying or curing of the resultant granules is needed, simply because less moisture is present to begin with. Such high viscosity polymer solutions are not suitable for bulk granulation processes using spraying. Operating the inventive granulation process at a high temperature also contributes to reduced drying or curing time. It is not desirable to preheat the polymer solution prior to injection, as this tends to clog the injector sets and apertures, or during granulation. An alternate approach to achieve granule drying/curing is to produce granules at about room temperature followed by either microwaving the granules to reduce the residual moisture, or using a conventional dryer.

When the inventive process is operated at temperatures near 100° C. and using Borden's CR-583, as described in Table I below, it has been found that the final moisture content of the granules is less than 2% and a separate drying step is not necessary. It was also found that the granules prepared from ammonium sulfate and polymer have a more desirable critical humidity than ammonium sulfate by itself. Critical humidity is that humidity at a given temperature where the granules begin to absorb moisture from the atmosphere. A higher critical humidity means that the material has better storage stability.

Unlike most prior art processes, the granule size is readily controlled in this invention. Granule size is influenced by: the force of the impacting particles, the polymer viscoelasticity, the polymer flow rate, and to a lesser extent other variables such as temperature. The size of the granule is inversely proportional to the momentum of the impacting particles, which is determined by both the particle mass and velocity. Thus, high velocity particles generally result in smaller granules and lower velocity particles result in larger granules. Very dense particles, having higher momentum, also result in smaller granules when compared to lower density particles at the same velocity.

Particles particularly suitable for this invention include typical fertilizer particles having densities of about 2 to about 8 grams per cubic centimeter (g/cc) and able to reach velocities normally achievable in conventional, commercially-available granulation equipment. The size of the particles used in the practice of this invention can vary. As a practical consideration, they must be smaller than the desired granule size. Typically in the use of the inventive process for the production of fertilizer granules, particles with a range of size from about 0.05 mm to about 1.5 mm are useful.

Dust particles or very small particles often do not flow well in a rotating drum and do not achieve desirable momentum. However, it has been found helpful in reaching maximum crush strengths to add sufficient dust to bring the total percentage of the particles passing the Tyler #48 sieve to at least 10% by weight Examples of preferred impacting particles for fertilizer include ammonium sulfate, potassium sulfate, potassium chloride, diammonium phosphate, steel mill scale, and various plant micronutrients. Ammonium sulfate is commercially available from Honeywell International Inc., Hopewell, Va. Mixtures of materials may be used. The particles may also include herbicides, fungicides and/or pesticides as well as micronutrients such as zinc, manganese, and iron-containing materials.

Particles suitable for use with ureaform polymer having a recoverable compliance less than about 3 must be acidic particles and thus produce a solution preferably having a pH of less than about 6 when mixed with water. The particles may or may not be water soluble. The acidity is necessary to catalyze the polymerization reaction of the ureaform polymer that results in the increase in its viscoelastic properties, particularly its compliance. Examples of preferred impacting particles for use with ureaform polymer include ammonium sulfate, ammonium chloride, certain steel mill scales, and other particles capable of producing the specified pH. Mixtures of particles may be used provided that there are sufficient acidic particles present to produce the specified pH in water. The particles may also include herbicides, fungicides and/or pesticides as well as micronutrients such as zinc, manganese and iron-containing materials.

The particle bed can be comprised of fresh feed stock and recycled material. The recycle rate is usually determined by the amount of product that falls outside of the desired final granule size. Most prior art processes employ very high ratios of recycle: up to 3 parts of recycle to 1 part fresh feed (see Achorn, ibid.). The subject invention has a very low recycle rate of only about 0.25 to 0.05 parts recycle to 1 part fresh feed. The low recycle rate together with the high production capacity of this process results in relatively low capital cost.

Pan granulation is a common fertilizer granulation method, however, the inventive process does not work well in this equipment. Conventional pan granulation depends on spraying the binder on the surface of the bed and granules are formed on the surface. In contrast granules are formed under the surface in the inventive process and have no means to rise to the surface since commercial pan granulators have very little surface turn-over. However, a small pan operated in a batch mode at a sharp angle of about 45° is useful in the laboratory. Batch mode operation involves starting with a relatively full pan of particles but with no fresh particles being introduced. Injector sets useful for a rotating pan in the laboratory are one or more syringe needles, the tips of which are beneath the bed of particles. Infrared lamps heat the pan and its contents. Injection of the polymer begins when the desired temperature of the particles is reached and continues until all or almost all of the particles have been agglomerated to granules. Similar to a continuous process in a rotating drum, the granules in this sharply-angled pan pop up to the surface of the bed of particles leaving the particles on the bottom of the particle bed where they continue to contact the injectors.

Polymers suitable for use in this invention include those having a recoverable compliance between about 3 and 100 $Pa^{-1}$. Ureaform polymers having compliance below 3 may be used in this invention if the particles are acidic. It is expected that any polymer whose compliance is normally less than 3 but exhibits immediate increase in compliance upon contact by extraneous particles may be used in the inventive process. The viscosity, percent solids, and recoverable compliance of the polymers used in the following examples are listed in Table I

TABLE I

| Polymer Class | Trade Name | Viscosity (cp) | % solids[5] | Recoverable Compliance ($Pa^{-1}$) |
|---|---|---|---|---|
| Epi-DMA polymer[1] | Polypure C-309 | 900 | 50 | 12.87 |
| DADMAC polymer[2] | Polypure C-318 | 3870 | 40 | 7.58 |
| Hide Glue[3] | Franklin Industries Hide Glue | 3700 | 74 | 7.91 |
| Polyvinyl acetate | Borden Inc. Glue-All ® | 4860 | 38 | 1.51 |
| Ureaform Polymer[4] | Borden Inc. CR-583 | 1050 | 65 | 2.59 |
| Melamine-formaldehyde | C-305 | 2.5 | 8.8 | ~0 |

[1]Epi-DMA polymer is a product of the reaction of epichlorohydrin and dimethyl amine.

TABLE I-continued

| Polymer Class | Trade Name | Viscosity (cp) | % solids[5] | Recoverable Compliance ($Pa^{-1}$) |
|---|---|---|---|---|

[2]DADMAC stands for dimethyldiammoniumidallyl ammonium chloride polymer.
[3]Hide glue is derived from animal hides and is a commercial product of Franklin Industries.
[4]CR-583 is a ureaform polymer and is a typical wood adhesive. Analysis of the dried polymer indicates it is comprised of 35% carbon and 31% nitrogen. A fresh sample of this polymer may have a viscosity of about 680 cp. The polymer may polymerize slowly at room temperature and the viscosity consequently increases. This polymerization may be slowed significantly by storage at 4° C. The sample of polymer used in most of the experiments herein was a sample with the slightly increased viscosity listed in Table 1 and which was stored at 4° C. to maintain this viscosity.
[5]The percent solids is (weight of solids/weight polymer solution) × 100.

Ureaform polymers are the product of the reaction of urea and formaldehyde. When dried, ureaform polymers have very limited solubility and therefore, are commonly used as slow release fertilizers. This enhances the value of granules made by the inventive process since slow release of plant nutrients over the plant growth cycle is more desirable. In some instances, formaldehyde emissions of a few parts per million (ppm) can be detected in the head space of a closed container of the granular product of this invention made with ureaform polymers such as CR-583. It has been found that a small amount of powdered urea (<2%) added to the particles can reduce such emissions to a nondetectable level.

EXAMPLES

EXPERIMENT #1

Inventive Examples 1–3 and Comparative Examples A and B

In order to demonstrate the effect of polymer elasticity on granulation in this invention, granules were made using polymers with different elasticity but nearly the same viscosity. A 9-inch (230 mm) diameter pan about 2 inches (50 mm) high, tilted at an angle of about 45°, and rotated at about 45 revolution per minute (rpm), was used. The pan was fitted with 4 lifters that were about ¼ inch (6.4 mm) high by 3 inches (75 mm) long and extended radially from the pan center. This small pan is to be distinguished from the commercial pan granulators. However it effectively represents the principles of a commercial-scale drum granulation process.

A preweighed batch of particles was placed in the pan and no granules were removed nor fresh particles added until the granulation process was finished. Two hundred grams (g) of ammonium sulfate particles supplied by Honeywell International Inc. were used in the examples using Hide Glue and Elmer's Glue-All®. A mixture of 200 g ammonium sulfate and 11 g of ferrous sulfate, a micronutrient, was used in the example of DADMAC. The ferrous sulfate played no significant role in the granulation process but was included to demonstrate that other fertilizer particles could be incorporated. Infrared lamps were set to maintain the temperature of the pan at about 90° C. during operation. Pan rotation was started then polymer was injected under the surface of the moving bed using two #16 gauge syringe needles (outside diameter was 1.65 mm with an aperture of about 1.36 mm)

at a total rate of 2 ml/min (corresponds to about 1 ml/min per aperture). Pan rotation was continued for a few minutes after the polymer injection was complete. Twenty five milliliters (ml) of polymer were injected in the case of DADMAC and Hide Glue examples. In the examples of Elmer's Glue-All®, 34.5 ml was injected to more fully demonstrate that this polymer, having little or no elasticity, did not work in this invention. Assessment of granulation was determined by measuring the SGN of the pan contents before and after the injection of the polymer. The data for this experiment are listed in Table II.

Thus it is seen from these examples that polymers having a high recoverable compliance regardless of their viscosity produced good granules when injected according to this invention.

EXPERIMENT #2

Inventive Examples 4–7, and Comparative Examples C and D

This experiment demonstrated the effect of acidic versus nonacidic particles on the granulation efficiency of ureaform polymers with low compliance. Following the same proce-

TABLE II

| Inv. Ex.[1] | Comp. Ex.[2] | Polymer | Viscosity (cp) | Recoverable Compliance ($Pa^{-1}$) | Starting SGN | Final SGN | Crush Strength (lbs.) |
|---|---|---|---|---|---|---|---|
| 1 | | Hide Glue | 3700 | 7.91 | 100 | 169 | n.d.[3] |
| 2 | | Hide Glue | 3700 | 7.91 | 50 | 168 | 3.15 |
| 3 | | DADMAC | 3870 | 7.58 | 50 | 157 | 4.59 |
| | A | Glue-All ® | 4860 | 1.51 | 100 | 100 | n.d. |
| | B | Glue-All ® | 4860 | 1.51 | 50 | 50 | n.d. |

[1]"Inv. Ex." stands for Inventive Example.
[2]"Comp Ex." stands for Comparative Example.
[3]"n.d." stands for not determined.

The Hide Glue and DADMAC polymers produced approximately spherical granules with acceptable crush strength. The SGN measurements of the Inventive Examples demonstrate that the small starting particles, which had an average size of 0.5 or 1.0 mm, were incorporated to form granules having an average size of about 1.6 to 1.7 mm. Inventive Examples 1 and 2 demonstrate that the size of the final granules does not depend on the size of the particles used. In addition, the SGN numbers demonstrate that the yield of granules was high in all three of the Inventive Examples because the presence of significant quantities of remaining small particles would reduce the SGN. In contrast to the Inventive Examples, Comparative Examples A and B using Glue-All® generated only a few chips and curls about ½ inch long but the SGN of the particles did not increase.

dure and using the same equipment as in Experiment 1, a ureaform polymer, CR-583, having insufficient compliance alone ($J^0_e$, equal to or less than 2.59), was ejected into different types of particles, distinguished by their pH when slurried in water. For each run, about 25 ml of CR-583 polymer was injected under the of the moving bed using two #16 gauge syringe needles (outside diameter: 1.65 mm with an aperture of about 1.36 mm) at a total rate of 2 ml/min, which corresponds to about 1 ml/min per aperture. The temperature was between 45° C. and 90° C. The SGN of the starting particles and the entirety of the pan contents after injection was determined. The crush strength for the four Inventive Examples products was also determined. The data for this experiment are presented in Table III.

TABLE III

| Example | | Starting Particles | | | Product | |
|---|---|---|---|---|---|---|
| Inventive | Comparative | Type | PH[1] | SGN | SGN | Crush Strength (lbs) |
| | C | Play Sand[2] | 7.0 | 100 | n.d. (wet mass) | n.d. |
| | D | Crushed River Gravel[3] | 6.7 | 120 | n.d. (wet mass) | n.d. |
| 4 | | Ammonium Sulfate[4] | 5.5 | 35 | 72 | 4.4 |
| 5 | | Ammonium Sulfate | 5.5 | 100 | 245 | 4.6 |
| 6 | | Techne Sand[5] | 5.6 | 12 | 118 | >14 |
| 7 | | Steel Mill Calcine Dust[6] | 3.9 | 15 | 25 | 7.0 |

[1]The pH was measured in a 10% slurry of the particles.
[2]The play sand was purchased in a 50 pound (lb) bag at a local hardware store and is sold primarily for children's outdoors amusement.
[3]Commonly available river gravel was crushed and sieved to provide inert particles in the range of passing a Tyler screen #10 and retained on a #20 screen (1.70 and 0.85 mm respectively).
[4]The ammonium sulfate is a commercial product of Honeywell International Inc.

TABLE III-continued

|  Example  | | Starting Particles | | | Product | |
| --- | --- | --- | --- | --- | --- | --- |
| | | | | | | Crush Strength |
| Inventive | Comparative | Type | PH[1] | SGN | SGN | (lbs) |

[5]Techne Sand is aluminum oxide particles that pass a Tyler #80 screen with 0.17 mm holes and was obtained from a heating sand bath provided by Techne Corporation of Princeton, NJ.
[6]Steel mill calcine dust was obtained from Frit Industries, Ozark, Al. Its major phase if $Fe_2O_3$ with a minor amount of $Fe_3O_4$ and even smaller amounts of silicon, magnesium, zinc, and other oxides.

Figure 11:
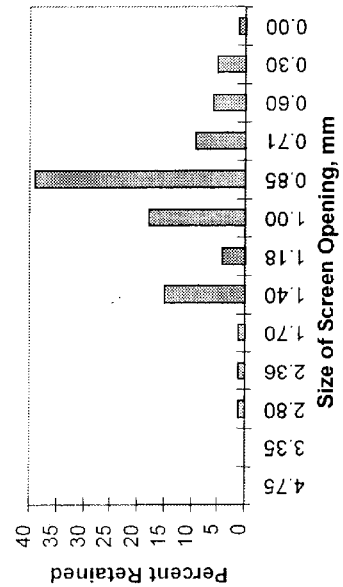
FIG. 11 illustrates bar graph of the showing sieve analyses for ammonium sulfate starting particles and product size.
Figure 11:
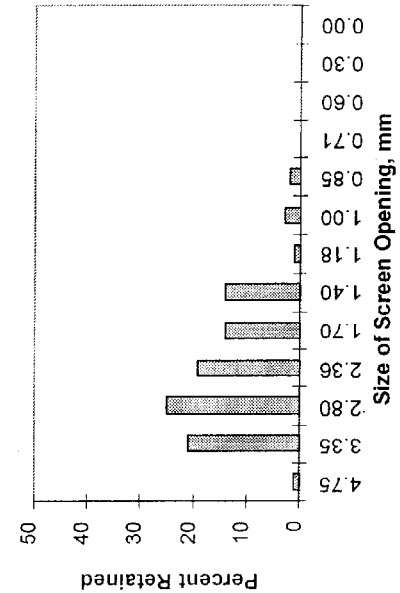
Figure 11:
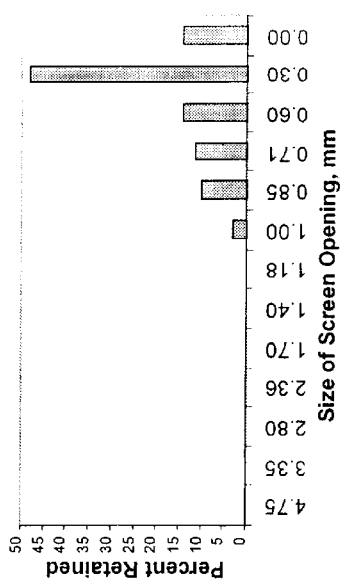
Figure 11:
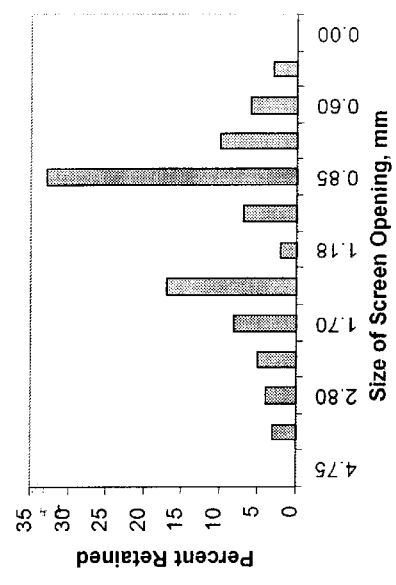
Figure 12:
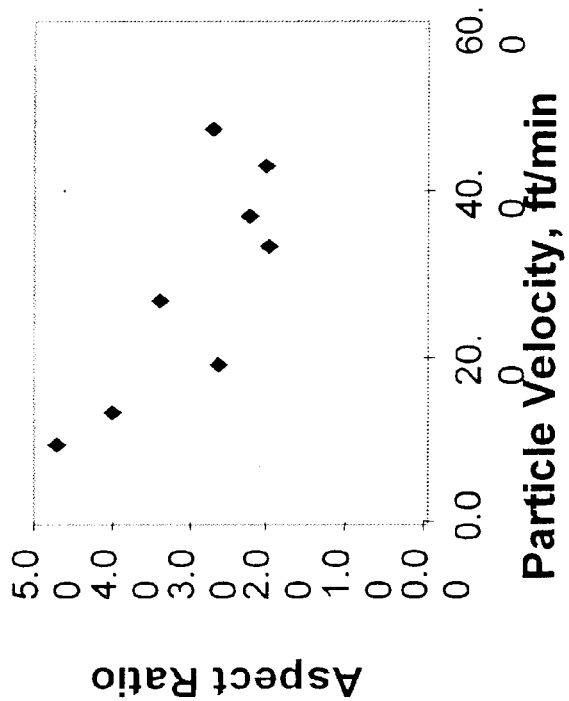
FIGS. 12–13 illustrates the effect of particle velocity on the aspect ratios of granules produced.
Figure 12:
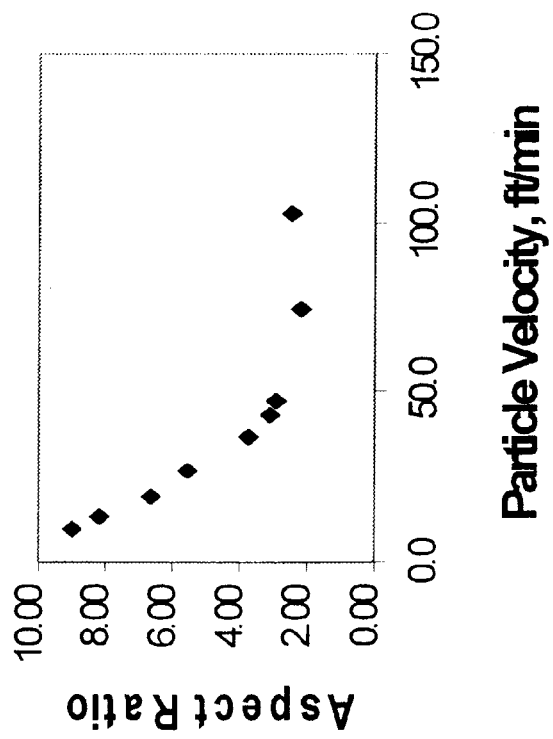
Figure 13:
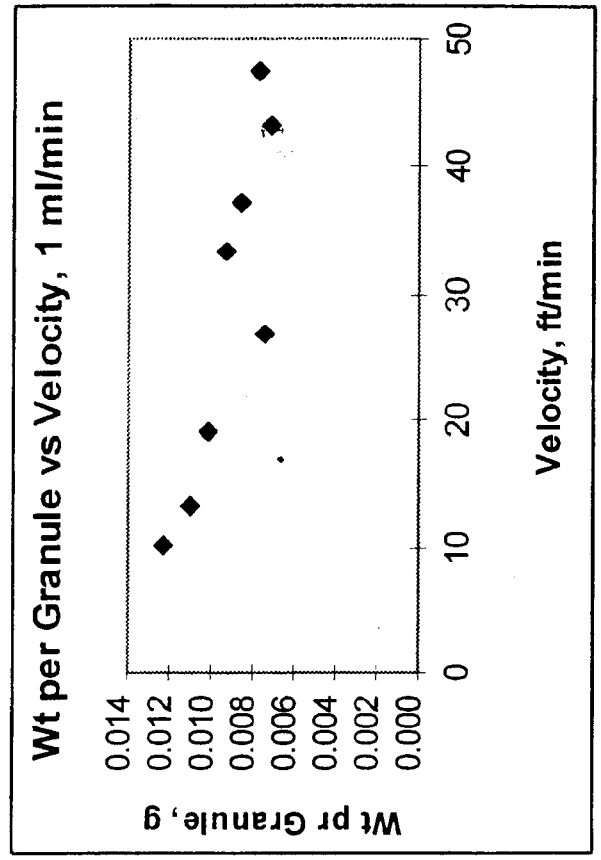
Figure 13:
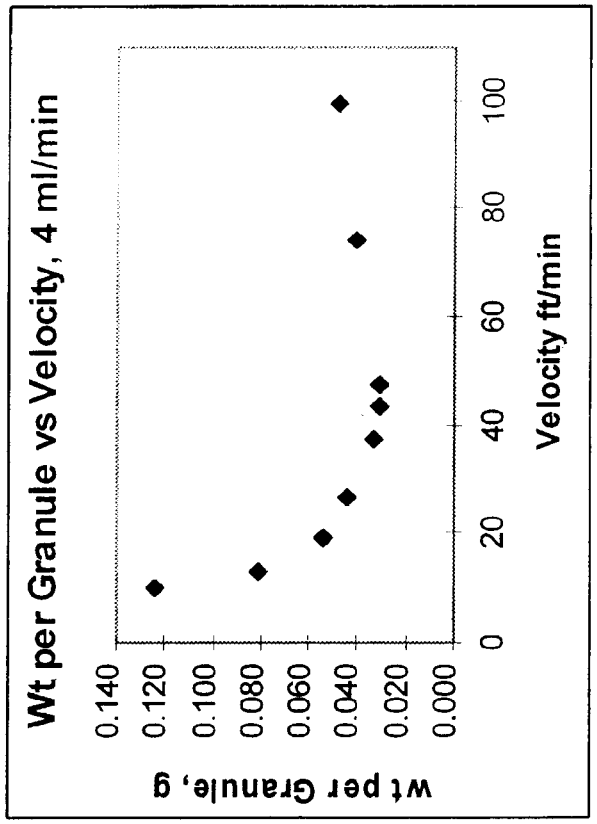

By the time all the CR-583 polymer had been injected into the non-acidic particles of Comparative Examples C and D, the entire mass of particles had become wet which, upon curing, became hard and stuck to the pan, mostly as one unit. In marked contrast, when the polymer was injected into acidic particles in Inventive Examples 4, 5, 6 and 7, individual and roughly spherical granules were formed that rose to the top of the tumbling bed. Crush strength of these granules was acceptable by fertilizer industry standards. The SGN values demonstrate that the yield of granules was high. The sieve analyses for the ammonium sulfate starting particles and granules are shown bar graphs at FIG. 11. Similar results were obtained for the Techne sand and calcine dust.

Thus is seen from these examples that acidic particles and low compliance ureaform polymer produced good granules when the inventive process was used. Furthermore, it may be seen from the bar graphs of the product size that the amount of fine (<0.5 mm) or oversize particles (>3.35 mm) are small and hence recycle would be less than 10%.

EXPERIMENT #3

Inventive Examples 8–10 and Comparative Examples E, F, G and H

Particle velocity is important because it establishes momentum and flux for a set of given conditions. Yet, it is almost impossible to measure in a rotating drum or tilted pan. However, if a pan is fixed horizontally, the particles cannot slip and therefore have the same velocity as the pan. Different velocities can also be obtained by positioning a single injector at different distances from the center of the pan and/or by changing the rotational speed of the pan. However, it must be realized that the data obtained can only approximate an actual commercial process where the granule is free to tumble.

Accordingly, a 9-inch (230 mm) diameter pan with a depth of about two inches (50 mm) was placed horizontally and filled with sand particles (Play Sand, see Table III for more information). A single #16 gauge hypodermic needle (outside diameter: 1.65 mm with an aperture of about 1.36 mm) was inserted just below the surface (about 0.25 inch) at various distances from the center of the pan (0.5, 2.0, and 4.25 inches) and the rotational speed of the pan was also varied (5, 20, and 45 rpm) to achieve different velocities. For instance, with the injector positioned at 4.25 inches from the pan center, the circumference of one revolution (inches per revolution) of the pan is equal to $2 \times \pi \times 4.25$. If the pan is turning at 45 rpm, the particle velocity at the point of injection is $45 \times 2 \times \pi \times 4.25 = 1201$ inches/minute (100.1 feet/minute). Different temperatures were obtained by means of infrared lamps. Polymer was injected into the moving bed of particles at a rate of 1 ml/min for about 15 seconds so that the total amount of polymer injected was about 0.25 ml. For further clarification, it is noted that at 45 rpm, the pan made about 11 revolutions in the 15 seconds but at 5 rpm, only about 1 revolution was made in the 15 seconds. There was no agitation, tumbling, or mixing in the circular area where the polymer was injected. Granules formed and remained in the area adjacent to the path the needle traced in the particle bed. The granules produced by this arrangement were not generally acceptable for commercial purposes because no dust was included and crush strengths were consequently low.

Particles and granules were separated by collecting all the particles and granules for a depth of about 1 inch and a width of about 2 inches, 1 inch on either side of the circle traced by the needle. The granules were separated by sieving through a Tyler #10 screen which has an opening size of 1.70 mm. The largest particles in the starting sand were 1.40 mm, therefore, any granules smaller than 1.70 mm but greater than 1.40 mm were ignored. Size analysis of the granular product was conducted by passing the #10-screen-retained material retained on the #10 screen (1.70 mm) through a #6 screen (3.35 mm opening) and weighing the amount retained on a #6 screen. The percent of granules larger than 3.35 mm was calculated by dividing the weight retained on the #6 screen by the total weight of material retained on the #10 screen and multiplying by 100. The percent of granules larger than 3.35 mm as a function of particle velocity is recorded in Table IV.

TABLE IV

| Examples | | | | Percent of granules larger than 3.35 mm Particle Velocity (ft/min) | | | | | |
| --- | --- | --- | --- | --- | --- | --- | --- | --- | --- |
| Inventive | Comparative | Polymer | Temperature | 1.3 | 5.2 | 11.8 | 20.9 | 44.5 | 100.1 |
| 8 | | C-309 | 90° C. | 100% | 86% | 44% | 20% | 0% | 73% |
| 9 | | C-309 | 70° C. | 58% | 28% | 17% | 15% | 22% | 16% |
| 10 | | C-309 | 50° C. | 59% | 33% | 69% | 0% | 0% | 13% |
| | E | C-305 | 90° C. | 0% | 0% | 0% | 0% | 0% | 0% |
| | F | C-305 | 70° C. | 0% | 0% | 0% | 0% | 0% | 0% |
| | G | CR-583 | 40° C. | 19% | 0% | 0% | 0% | 0% | 0% |

TABLE IV-continued

| Examples | | | | Percent of granules larger than 3.35 mm Particle Velocity (ft/min) | | | | | |
|---|---|---|---|---|---|---|---|---|---|
| Inventive | Comparative | Polymer | Temperature | 1.3 | 5.2 | 11.8 | 20.9 | 44.5 | 100.1 |
| | H | CR-583 | 90° C. | 69% | 4% | 3% | 0% | 8% | 0% |

This data clearly shows that viscoelastic polymers having sufficient recoverable compliance, such as C-309, produce granules (Inventive Examples 8, 9 and 10) whereas those polymers with little or no viscoelasticity do not produce granules (Comparatives Examples E, F, G and H). As a matter of note, the total weight of granules produced by the viscoelastic polymer, C-309, in this experiment was relatively small, 0.1 to 0.9 g. This is a result primarily of the high solvent content of this polymer (50%). The inconsistent high percentage (73%) found for the speed of 100.1 ft/min in Inventive Example 8 is believed to be the result of errors in weighing and collecting small quantities. Overall, these data demonstrate the inverse effect of particle velocity on granule size at a constant polymer flow rate and operating temperature; an increasing particle velocity decreases the size of the resulting granules. The data for C-309 also suggests that smaller granules are obtained at lower temperatures, particularly at higher velocities.

In Comparative Examples E and F, no granules formed at all. Although the polymer, C-305, is a very dilute polymer by necessity, the expected weight of granules if formed was estimated to be within the detectable range (expected approximately 0.2 g). Therefore, the lack of granule formation was attributed to the polymer's low elasticity. In Comparative Example H, the low viscoelastic polymer, CR-583, produced a significant weight of material retained on the #6 screen. However, the retained material was in the form of an elongated rod about 4 mm in diameter by 30 mm long.

Generally these data demonstrate that polymers with low elasticity are not applicable for this invention but that polymers with high elasticity produce good granules. Furthermore, when the polymer has appropriate elasticity and granulation occurs, the size of the granules decline with increasing particle velocity. Thereby, control of granule size in the inventive process is demonstrated.

EXPERIMENT #4

Inventive Examples 11–15

To demonstrate the effect of particle velocity on granule formation for different polymers, the following experiment was performed following the procedure and using the same equipment as in Experiment 3 but with ammonium sulfate particles. The resulting granules were analyzed by the same sieve analysis described in Experiment 3. Polymer was injected at a rate of 1 ml/min for 15 seconds so that the total amount of polymer injected was about 0.25 ml. The moving particle bed was comprised of ammonium sulfate. As in Experiment 3, there was no agitation, tumbling, or mixing in the circular area where the polymer was injected. In the interest of accuracy, any possible granules between 1.40 mm and 1.70 mm were ignored. The percent by weight of granules larger than 3.35 mm is presented in Table V.

TABLE V

| Inventive | | | Percent of granules larger than 3.35 mm Particle Velocity (ft/min) | | | | | |
|---|---|---|---|---|---|---|---|---|
| Example | Polymer | Temperature | 1.3 | 5.2 | 11.8 | 20.9 | 47.1 | 100.1 |
| 11 | C-318 | 70° C. | 100% | 94% | 74% | 66% | 28% | 45% |
| 12 | Hide Glue | 90° C. | 96% | 73% | 68% | 48% | 57% | 52% |
| 13 | Hide Glue | 70° C. | 97% | 92% | 73% | 62% | 41% | 26% |
| 14 | CR-583 | 70° C. | 96% | 77% | 35% | 33% | 4% | 0% |
| 15 | CR-583 | 50° C. | 100% | 74% | 55% | 36% | 23% | 18% |

These data further support that there is a consistent trend independent of the polymer used and within experimental error, toward fewer large particles as the particle velocity increases. Control of particle size is thus demonstrated again. Data for granules of other sizes, i.e. those retained on a Tyler #7 screen (2.80 mm) exhibited similar results as those in the Table for 3.35 mm granules but the number of granules was fewer. An experiment conducted at a flow rate of 3 ml/min produced similar results as those in the Table. The total weight of granules produced was typically between 1 and 4 grams for each of these Inventive Examples.

Similar to Inventive Examples 8, 9 and 10, Inventive Examples 12 and 13 showed that smaller granules resulted at lower temperatures at higher particle velocity. In contrast, Inventive Examples 14 and 15, show an opposite effect of temperature: larger granules resulted at lower temperatures at higher particle velocity. Although Applicant does not wish to bound by this theory, it is thought that this difference may be the result of the fact that CR-583 cures very fast at higher temperatures. In either case, temperature seems to have some effect on final granule size and, depending on the properties of the polymer used, can be used to control granule size.

EXPERIMENT #5

Inventive Examples 16–32

In order to further define this invention, granules were prepared using the same procedure and equipment as in Experiment 3 but using ammonium sulfate instead of sand and the injection period was for 1 revolution. Also the needle was held at 4.25 inches from the center and only the rpm was varied. The polymer used here was CR-583 at a viscosity of 680 cp, obtained as a fresh sample from Borden Inc. Granulation was done at a temperature of 40° C. In this experiment, the granules produced were separated from the ungranulated ammonium sulfate particles by sieving through a Tyler #12 screen (1.40 mm). A representative portion of the granules was weighed and counted. The average granule weight (wt) produced at different velocities was then calculated by dividing the weight by the number of granules weighed. The weight is proportional to size and is easier to measure than the size. The data is shown in Table VI. Inventive Examples 16 through 23 were done at a polymer flow rate of 1 ml/min and Inventive Examples 24 through 32 were done at a polymer flow rate of 4 ml/min.

TABLE VI

| Inventive Example | Particle Viscosity (ft/min) | Average Wt of Granules (g) |
|---|---|---|
| 16 | 10.2 | 0.0123 |
| 17 | 13.3 | 0.0111 |
| 18 | 19.1 | 0.0102 |
| 19 | 26.7 | 0.0074 |
| 20 | 37.1 | 0.0093 |
| 21 | 43.1 | 0.0085 |
| 22 | 47.6 | 0.0072 |
| 23 | 74.1 | 0.0077 |
| 24 | 10.2 | 0.1242 |
| 25 | 13.3 | 0.0811 |
| 26 | 19.1 | 0.0543 |
| 27 | 26.7 | 0.0446 |
| 28 | 37.1 | 0.0335 |
| 29 | 43.1 | 0.0303 |
| 30 | 47.6 | 0.0305 |
| 31 | 74.1 | 0.0400 |
| 32 | 99.4 | 0.0478 |

The average weight is representative of average size and as can be seen from the data, the size decreases with increasing particle velocity at both polymer flow rates.

The sharp increase in granule size for a polymer flow rate of 4 ml/min at particle velocities less than about 20 ft/min is the result of insufficient particle flux for that polymer flow rate. The very large granules contained excess polymer. This observation was confirmed by analysis for carbon content of granules produced under similar conditions. Carbon content is proportional to polymer content. The granules produced at a velocity of 47.1 ft/min contained 2.26% carbon and those produced at a velocity of 5.2 ft/min contained 3.31% carbon, a 46% increase. The conclusion that the large granules contain excess polymer is further supported by the data in Experiment #6. The uptick in average size at high velocity may be the result of trying to stop injection after only 1 revolution at high velocity (1.28 seconds).

EXAMPLE #6

Inventive Examples 33–50

This experiment was conducted using the procedure and equipment of Experiment 3 to examine the effect of particle velocity on the aspect ratio of the granules produced. The injection period was for 1 revolution and the needle was held at 4.25 inches from the center while only the rpm was varied. Aspect ratio is the longest dimension divided by the shortest dimension of the granules. A perfect sphere would have an aspect ratio of 1. An elongated structure would have an aspect ratio much greater than 1. Excess polymer would make the granule more easily distorted. Under extreme conditions long strings of polymer with a coating of particles can be formed. These have very high aspect ratios.

The polymer used was CR-583 and the moving bed of particles was comprised of ammonium sulfate. The pan was maintained at 90° C. Where possible fifteen granules were measured for each particle velocity and polymer flow rate combination; no fewer than ten granules were measured in every instance. Graphical representations of the data in the table are also presented. Inventive Examples 33 through 41 were made at a polymer flow rate of 4 ml/min and Inventive Examples 42 a polymer flow rate of 1 ml/min.

TABLE VII

| Inventive Example | Particle Viscosity (ft/min) | Average Aspect Ratio |
|---|---|---|
| 33 | 10 | 9.0 |
| 34 | 31 | 8.2 |
| 35 | 19 | 6.6 |
| 36 | 27 | 5.6 |
| 37 | 37 | 3.7 |
| 38 | 43 | 3.1 |
| 39 | 48 | 2.9 |
| 40 | 74 | 2.2 |
| 41 | 103 | 2.5 |
| 42 | 9 | 4.7 |
| 43 | 13 | 4.0 |
| 44 | 19 | 2.6 |
| 45 | 27 | 3.4 |
| 46 | 33 | 2.0 |
| 47 | 37 | 2.2 |
| 48 | 43 | 2.0 |
| 49 | 48 | 2.7 |
| 50 | 103 | 2.6 |

These data show that high aspect ratios occurred at about 10 ft/min or less for both polymer flow rates used. The high aspect ratio is the result of excess polymer making the granule more easily deformed by the impacting particles as it is being formed. Therefore, the minimum particle flux for this system occurs at particle velocities of about 10 ft/min. The minimum particle flux will vary from system to system and for different polymer and particle combinations. The data presented here illustrates the effect of excess polymer and serves to define further the invention. If high polymer content is desired, for instance to enhance slow release properties, then the invention may be operated under low flux conditions. Tumbling in a rotating drum, for instance, reduces or eliminates the elongated granules bringing them closer to the more desirable spherical shape.

EXPERIMENT #7

Inventive Examples 51–54

It is often desirable to incorporate plant micronutrients such as zinc, iron, or manganese in fertilizer granules. These granules may be of the type ready for direct application in that they contain low levels of such micronutrients as needed by the plant in proportion to the nitrogen content. Alternatively, the granules may contain high levels of micronutrients so that these granules can be blended with other fertilizer granules to produce a finished material containing the appropriate level of micronutrients. Using the same procedure and equipment as in Experiment 2, a rotating pan was loaded with 234 g of particle mixtures as shown in the Table VIII, heated to 40° C. using infrared lamps, and 30 ml (39 g) of the ureaform polymer CR-583 at a viscosity of 1050 cp was injected through two #16 needles at a total rate of about 2 ml/min (about 1 ml/min per aperture). In the particle bed mixtures, it was necessary to avoid an excess of the highly basic particles: Zn60, Zn55, and Fe65 which produce a pH of 9.85, 9.49, and 11.12, respectively, when slurried in water. An excess of the highly basic particles inhibited the curing of the CR-583 polymer necessary for effective granulation with this invention. The particle size of the different micronutrients was about 0.3 mm or smaller and that of the ammonium sulfate was less than 0.5 mm, so that the average SGN of the starting particles was less than 50. After completion of the polymer injection, sieve analysis and crush strength measurements were performed. The sieve analysis showed that 99% or more of the particles were granulated. The data are in Table VIII.

Two types of polymer injector sets were used. In some cases, four #16 syringe needles were placed about 2 inches from the particle entrance end of the drum, and separated from each other by about 1 inch. The needles were positioned so that they extended into the bed of particles by about ½ inch. In other experiments, a ⅛ inch diameter stainless steel tube with four ¹⁄₃₂-inch holes drilled into it was used as a polymer injector set. The holes were about 1 inch apart and were in line with each other on the same side of the tube.

TABLE VIII

| Inventive | Particle Bed Components[1] (g) | | | | | | | Product | |
| --- | --- | --- | --- | --- | --- | --- | --- | --- | --- |
| Example | Fe70 | Fe55 | Fe65 | Zn60 | Zn55 | AS[2] | urea | SGN | Crush Strength (lbs) |
| 51 | 50 | 50 | 50 | 0 | 0 | 75 | 9 | 279 | 6.26 |
| 52 | 50 | 0 | 0 | 25 | 0 | 150 | 9 | 214 | 4.29 |
| 53 | 0 | 0 | 50 | 0 | 25 | 150 | 9 | 170 | 4.93 |
| 54 | 50 | 50 | 50 | 0 | 0 | 75 | 9 | 194 | 4.21 |

[1]The micronutrient materials were obtained from Frit Industries, Ozark, Alabama and originated from a variety of sources such as steel mill scale and calcine dust. The numbers following the element symbol represent the percentage of that micronutrient that is contained in the raw material.
[2]The abbreviation "AS" is used to represent ammonium sulfate.

The data in the table shows that good granulation was obtained incorporating a variety and different amounts of micronutrients. Crush strengths in all cases was acceptable.

EXPERIMENT #8

Inventive Examples 55–58: Scale Up to a 10-Inch Drum

An experiment was performed to study the inventive process in a continuous process in a rotating drum. Accordingly, a 10-inch diameter by 5 feet long stainless steel drum was fitted with 4 feet long square (¼ inch by ¼ inch) bars on the inside wall parallel to the center axis. The bars served as flights to lift the bed of particles improving mixing and velocity. The drum was rotated by a commercially-available long ball milling device designed to accommodate several ball mill jars. At the injection end of the drum, a 1-inch high flat ring was installed to keep particles from spilling out and there was no ring at the exit end. The drum was inclined by about 2 inches. The temperature in the drum was maintained by electrical infrared heaters. Each run was effectively continuous.

The particles were premixed, preheated in an oven and then metered into the drum from a hopper through one dry chemical vibratory feeder into the injection zone. The ureaform polymer, CR-583, used in all the examples of this experiment, was then injected into the moving bed of particles. After the granules formed and were knocked off the injectors, they tumbled and cured as they traveled the length of the drum. Granules and ungranulated fines were collected as they exited the drum and the SGN was determined of a representative portion, as well as an average crush strength. These data are recorded in Table IX, as well as the polymer flow rate, the particle feed rate, the particle bed composition, and the temperature (temp.) at the exit point of the drum.

TABLE IX

| Inv. | | | Drum speed | Polymer flow rate[2] | Particle Feed rate | Drum Temp. | SGN | | C.S.[3] |
| --- | --- | --- | --- | --- | --- | --- | --- | --- | --- |
| Ex. | Injector | Particles | (rpm) | (ml/min) | (g/min) | (° C.) | Starting | Final | (lbs) |
| 55 | needles | AS | 18 | 17 | 310 | 60 | 92 | 146 | 4.77 |
| 56 | ⅛-inch tube | AS | 13 | 5 | 260 | 65 | 92 | 142 | 4.43 |
| 57 | needles | AS | 14 | 15 | 310 | 74 | 92 | 261 | 5.05 |
| 58 | needles | mixture[1] | 14 | 5 | 310 | 81 | 90 | 159 | 4.09 |

[1]This mixture was 90% ammonium sulfate, and 5% each of ferrous sulfate and manganese sulfate, both common micronutrients.
[2]This is the total polymer flow rate.
[3]"C.S." stands for Crush Strength.

The 10-inch drum produced product which was acceptable, both in size and crush strength. However, certain process problems were encountered which indicated that the diameter of the drum was too small. These problems included maintaining sufficient bed depth to cover the needles, bending of the needles of the injector set, clearance between the injectors and the lifter bars, and crowded conditions which restricted support for the injectors. A more significant problem was encountered in keeping the injectors clean. The growing granules from the needles and tube often reached a size of ½ inch or more before being dislodged. Therefore, it was apparent that the particle velocity was too low to sweep the granules off the injector sets or the flux was too small. The wall velocity of the 10-inch drum at 14 rpm was about 36 ft/min but the particle velocity was substantially less. It was concluded that a 10-inch drum was not preferred because of its small diameter. In addition, it was discovered that the drum was unnecessarily long.

EXPERIMENT #9

Inventive Examples 59–62: Thirty-six Inch Diameter Drum

An experiment was performed to study the inventive process in a larger rotating drum and using a variety of injectors. A granulation drum was constructed from a piece of steel pipe 36 inches in diameter and 35 inches in length by mounting a 2-inch high flat ring at the particle entrance end, and a 1 inch high flat ring at the exit. The drum had eight, ¼-inch square, 29-inch long bars welded to the inside wall of the drum parallel to the axis to serve as flights to aid in lifting and tumbling of the particles. The drum was not equipped with heaters and the volumes required for operation of this large system were too great to allow preheating of the particles in an oven. Consequently, the drum was operated at room temperature and the product was collected then cured several hours later in a separate heating device.

The starting particle materials were premixed using a small motor-powered mortar mixer such as those used by brick masons. The mixed dry particles were fed into the drum from a hopper using a vibratory feeder.

Two polymer injectors sets were successfully demonstrated. One polymer injector set used consisted of a ½-inch stainless steel tube flattened down to about ⅜ inch with ten (10) 1/16-inch holes drilled into one rounded edge about 1 inch apart, center to center. Nozzles, consisting of 1-inch long ⅛-inch diameter stainless steel tubing, were welded over the holes. Another injector devised for use in this drum was a stainless steel tube, not flattened, with ten 1/32-inch holes drilled in line with each other and separated by about 1 inch. Hence, the injection zone, the linear distance in which polymer is injected into the particle bed, was about 9 inches long for both of these injectors. The drum was rotated at a speed of 10 to 16 rpm (peripheral speed of 93 to 149 ft/min). The data for this experiment are reported in Table X.

relative to the rotation speed of the drum confirmed that smaller granules are made at higher drum speed, i.e. Inventive Example 61 vs. Inventive Example 62 where the drum rotation was 16 rpm and 10 rpm, respectively.

EXPERIMENT #10

Inventive Example 63: Microwave Curing

Granules from this invention with high commercial importance consist of about 95% ammonium sulfate and about 5% ureaform polymer. The cost of heating the ammonium sulfate would be a large fraction of the total cost in a commercial process. Yet, in the inventive process, it is only necessary to heat the polymer once the granule has been formed. Thus, advantageously and in theory, the cost of heating could then be much less. Microwave heating will readily cure ureaform polymer without direct heating of the ammonium sulfate. Here I demonstrate that microwave power can be used to cure the polymer in granules made at room temperature.

An ordinary kitchen microwave oven (output rating approximately 800 watts) was tilted at an angle of 10 degrees from the horizontal. On each side of the oven, a 2-inch diameter hole was cut in the cavity. A 2-inch diameter by 10-inch long stainless steel tube was inserted into each hole and the interior end seam welded to the interior of the cavity. Calculation had shown that this would be sufficient to capture all the microwaves and prevent dangerous leakage; subsequent testing showed that there was no leakage. A 4-foot long Pyrex™ tube, having an outer diameter slightly less than the inner diameter of the stainless steel tubing, was inserted through the tubes, so that it was centered in the microwave oven cavity. A quarter-inch diameter plastic tube was fixed at the upper end so that nitrogen gas could be passed through the tube from the upper end to the lower end. The gas prevented condensation of the moisture from the curing of the polymer in the microwave area at the upper end of the tube. This condensation had been found to cause sticking of the fresh granules on their way down the tube. A wooden rod with a cardboard disk having approximately the same diameter as the inner diameter of the Pyrex™ tube, was inserted into the Pyrex™ tube from the lower end of the tube. This device allowed the top end of the tube to be completely filled full with uncured granules.

Uncured granules prepared by the method of Example 5 but at room temperature (about 22° C.) were quickly placed in the Pyrex™ tube and cured by passing them through the

TABLE X

| Inv. Ex. | Injector | Particles | Drum speed (rpm) | Polymer flow rate[2] (ml/min) | Particle Feed rate (g/min) | SGN Starting | SGN Final | Crush strength (lbs) |
|---|---|---|---|---|---|---|---|---|
| 59 | nozzles | mixture[1] | 16 | 92 | 1541 | 25 | 205 | 6.81 |
| 60 | ½-inch tube | AS | 16 | 178 | 4762 | 53 | 153 | n.d. |
| 61 | nozzles | AS | 16 | 109 | 6141 | 96 | 145 | 4.81 |
| 62 | nozzles | AS | 10 | 40 | 809 | 93 | 179 | 5.25 |

[1]This mixture was 47% ammonium sulfate particles, 47% ammonium sulfate dust, and 6% ferrous sulfate.
[2]This is the total polymer flow rate.

The SGN of the product was significantly higher than that of the starting materials indicating good granulation for each of these Inventive Examples. The SGN of the product microwave oven. The oven was run at full power and the rate of feed was controlled by pulling the wooden rod out of the tube at a rate of about 4 inches per minute. Thus all of the granules passed through the microwave zone at a rate of about 240 g in 2 minutes. The temperature of the granules reached 101° C. and was measured immediately after exiting the tube, using an optical pyrometer. There was little heat loss from the interior of the tube to the collecting pan. So the temperature was roughly the same. The crush strength of the microwave-cured granules was about 4.32 lbs while still warm and continued to increase while cooling. It was estimated that satisfactory curing could be obtained at a rate at least twice the rate used in this experiment.

I claim:

1. A granulated fertilizer comprised of ureaform polymer and ammonium sulfate particles and having a crush strength of at least about 4 pounds, prepared by the process comprising the steps of:

(a) injecting the polymer having sufficient viscoelasticity through one of small holes or nozzles; and (b) impacting the particles on said polymer at the injection point wherein said polymer is injected until the total force of the impacting particles on said polymer overcomes the viscoelasticity of said polymer whereupon a formed granule exits said injection point.

2. The granulated fertilizer according to claim 1 wherein said impacting particles comprise less than about 0.25 pounds of recycled particles per pound of formed granules.

* * * * *